United States Patent [19]

Jenkins et al.

[11] Patent Number: 4,702,071
[45] Date of Patent: Oct. 27, 1987

[54] INLET PARTICLE SEPARATOR

[75] Inventors: John E. Jenkins, Hemel Hempstead; John Sperinck, Watford; Michael J. Buller, Kings Langley, all of England

[73] Assignee: Rolls-Royce plc, London, England

[21] Appl. No.: 875,992

[22] Filed: Jun. 19, 1986

[30] Foreign Application Priority Data

Jun. 28, 1985 [GB] United Kingdom ............... 8516363

[51] Int. Cl.⁴ .............................................. F02G 3/00
[52] U.S. Cl. ............................ 60/39.092; 415/121 A; 415/168; 55/306
[58] Field of Search ............... 60/39.092; 415/121 A, 415/168; 55/306, 398; 244/53 B, 121

[56] References Cited

U.S. PATENT DOCUMENTS 3,966,355 6/1976 Pierpoline ............................ 415/168
3,979,903 9/1976 Hull, Jr. et al. ................... 60/39.092
4,617,028 10/1986 Ray et al. .......................... 60/39.092

FOREIGN PATENT DOCUMENTS 58105    5/1979  Japan ............................... 415/121 A
1412780  11/1975 United Kingdom .
2131882  6/1984  United Kingdom .
2133475A 7/1984  United Kingdom ............. 60/39.092

Primary Examiner—Louis J. Casaregola
Assistant Examiner—Donald E. Stout
Attorney, Agent, or Firm—Parkhurst & Oliff

[57] ABSTRACT

To prevent dust and other debris from entering the compressor (12) of a gas turbine engine (10) an inlet particle separator (30) is provided. Air contaminated with dust and debris is induced into a scavenge chamber (32). An exhaust vent (35) is provided from the scavenge chamber (32) through which the contaminated air is ejected to atmosphere. Flow dividers (40,42,44) are positioned in the scavenge chamber (32) to ensure that the flow into the chamber is uniform around the inlet passage.

8 Claims, 9 Drawing Figures

INLET PARTICLE SEPARATOR

BACKGROUND OF THE INVENTION

This invention relates to an inlet particle separator in which there is provided an annular intake duct for receiving intake gas containing particles, a-d a circumferentially extending scavenge chamber in flow communication with the intake duct together with means for directing a flow of gas and particles into the scavenge chamber.

DESCRIPTION OF PRIOR ART

It is desirable to prevent particles of dust and debris from entering the compressor of a gas turbine engine or similar turbomachine to minimize wear and the possibility of damage to compressor blades. The relatively high mass flow through gas turbine engines makes conventional air filters difficult to use and undesirable from an efficiency standpoint. Furthermore, a conventional air filter would suffer from icing problems at the air intake, especially in high altitude aircraft. However, gas turbine engines installed in helicopters can encounter very high levels of dust and debris ingestion due to the wash of the rotor blades during take-off, landing and hover. Therefore there is a need, particularly with helicopter engines, for a means of filtering out particles in the incoming airflow.

Gas turbine engine inlet particle separators are described in UK Patent Applications Nos. 2133475A and 2131882A and UK Patent Specification No. 1412780. In all three, contaminated air is directed into a circumferentially extending scavenge chamber while relatively clean air passes into a radially inner annular duct leading to the engine compressor. The contaminated air is scavenged from the chamber by extraction means through one or more exhaust vents.

In many applications there will only be enough space in the engine nacelle for one exhaust vent. With prior known inlet particle separators of the type described above the mass flow into the scavenge chamber will vary circumferentially according to the distance from the exhaust vent. Most of the flow into the scavenge chamber from the intake duct will be in the region closest to the exhaust vent. At positions remote from the exhaust vent there will be less mass flow into the scavenge chamber allowing particles in this region to pass into the engine and also creating an uneven circumferential distribution of pressure in front of the engine compressor thus reducing efficiency.

SUMMARY OF THE INVENTION

The invention as claimed provides an inlet particle separator in which the scavenge chamber is provided with flow dividers which seek to provide a uniform flow into the scavenge chamber from the intake duct.

The advantages offered by the invention are that the airflow into the engine compressor will be more uniform and that less particles will enter and damage the engine. The efficiency of the compressor will therefore not be reduced due to a non-uniform flow at the compressor intake.

BRIEF DESCRIPTION OF THE DRAWINGS

The invention will now be described by way of example with reference to the accompanying drawings in which.

DESCRIPTION OF THE PREFERRED EMBODIMENTS

Figure 1:
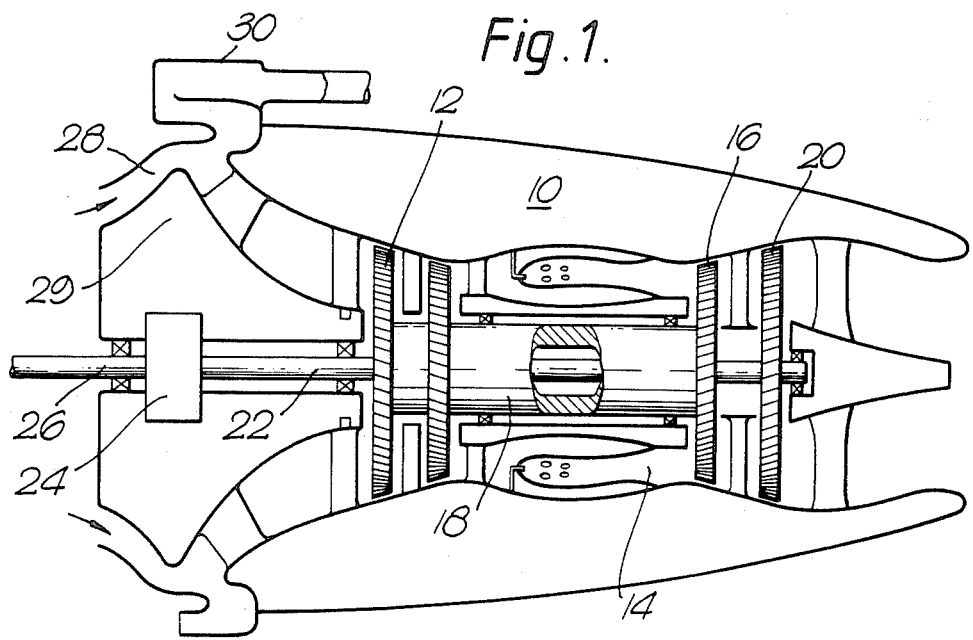
FIG. 1 schematically depicts a gas turbine engine provided with an inlet particle separator according to the present invention.

Referring to FIG. 1, a gas turbine engine 10 comprises an axial compressor 12 which delivers compressed air to a combustion chamber 14. After combustion, the resultant gases pass through the drive a high pressure turbine 16, which itself drives the compressor via shaft 18; the gases subsequently pass through and drive a low pressure turbine 20 which drives a load through a shaft 22 and reduction gearbox 24. The load could be helicopter rotor blades which are connected to an ouput shaft 26. The engine 10 is provided with an inlet particle separator (IPS) 30 to remove particles of dust and debris from the incoming air.

Figure 2:
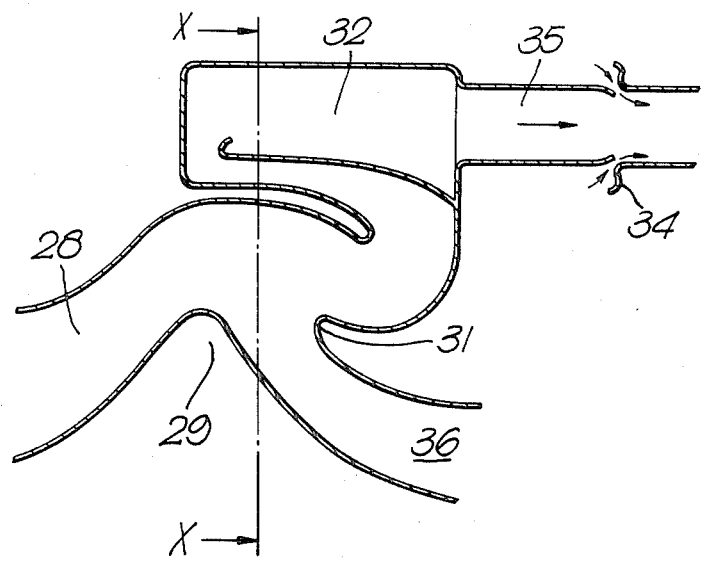
FIG. 2 shows in more detail the inlet portion of the engine in FIG. 1.
Figure 3:
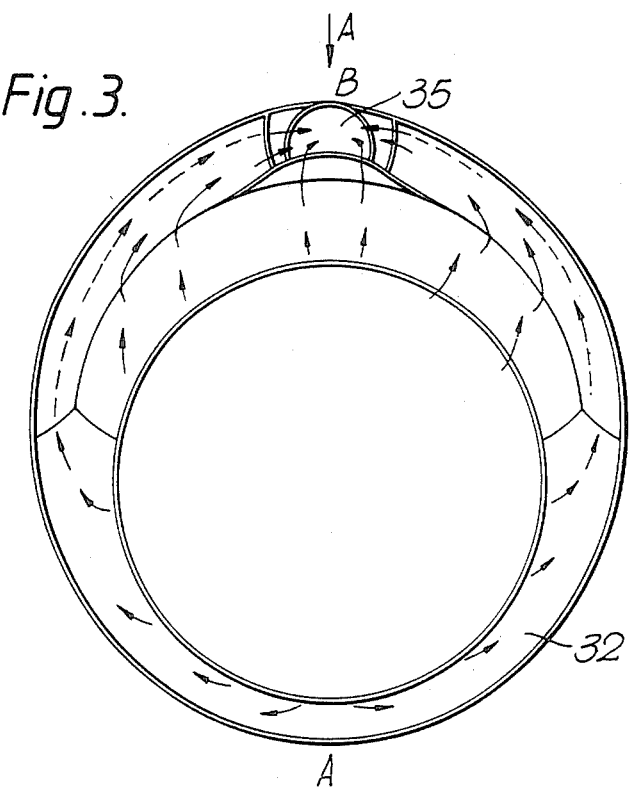
FIG. 3 is a sectional representation along the line X—X in FIG. 2.

Referring also to FIGS. 2 and 3 annular intake duct 28 receives intake air containing particles to be separated from a core flow to the compressor 12. A central hub 29, which forms the radially inner boundary of the intake duct 28, is shaped to direct the intake air containing particles into a circumferentially extending scavenge chamber 32. An annular splitter nose 31 is located downstream of the maximum hub diameter in order to split the flow into a relatively uncontaminated core flow and a flow of air and particles.

Due to the shape of the hub 29 and the location of the splitter nose 31, air induced into the compressor 12 has to turn sharply into the radially inner compressor intake 36 while the particles cannot change direction as quickly and therefore tend to go into the scavenge chamber 32. An exhaust vent 35 of circular shape is provided to exhaust the contaminated air to atmosphere. Extraction means are provided for inducing the flow into the exhaust vent 35. An ejector pump 34 using compressed gas from the engine 10 is one way of achieving extraction.

As shown in FIG. 3, the scavenge chamber 32 is axis-symmetrical about line AB and is of increasing flow area from A to B in the circumferential direction to cope with increasing mass flow toward the exhaust vent 35. Typically some 20% of the air flow in the intake duct 28 will flow into the scavenge chamber 32.

It is essential that the IPS does not cause a non-uniform flow into the compressor 12 by not 'pulling' an even amount of flow at all points circumferentially around the intake duct 28 despite only a single exhaust vent being provided. If the air distribution around compressor intake is distorted the efficiency of the compressor can be reduced.

Figure 4:
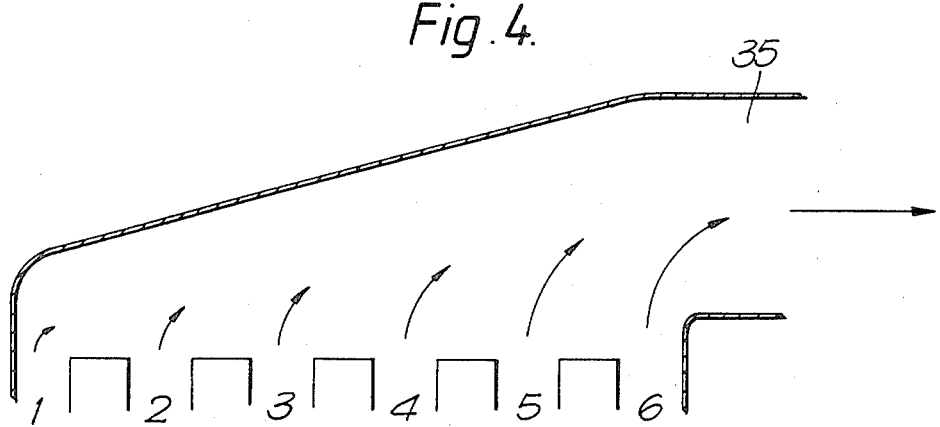
FIG. 4 is a linear representation of the flow pattern in an inlet particle separator without flow dividers.

FIG. 4 shows a linear profile of one half of the scavenge chamber 32 between points A and B in FIG. 3 with no flow dividers provided. The size of the arrows represent the quantity of mass flow passed at various circumferential positions due to the reduced pressure created by the extraction means. As shown, the contaminated air has an easier path into the exhaust vent at position 6 than at position 1. The inequality of flow creates a circumferential imbalance of flow into the compressor.

Figure 5:
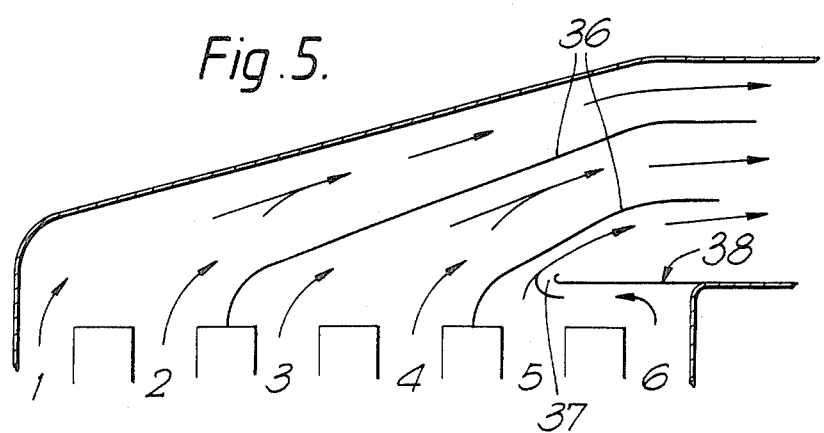
FIG. 5 is a linear representation of the flow pattern in an inlet particle separator provided with flow dividers.
Figure 6A:
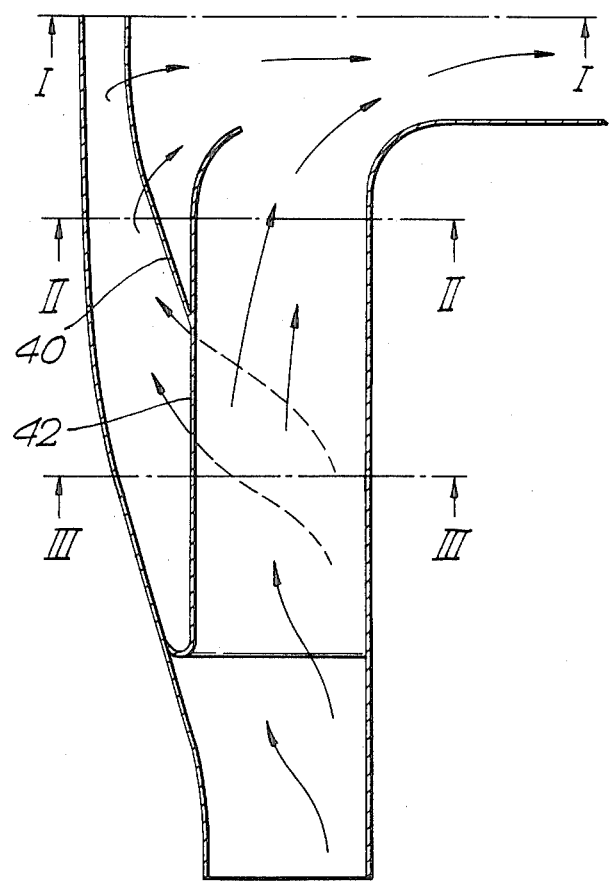
FIG. 6a is a view in the direction of arrow A in FIG. 3 of one half of the inlet particle separator with part of the outer wall omitted for clarity.
Figure 6B:
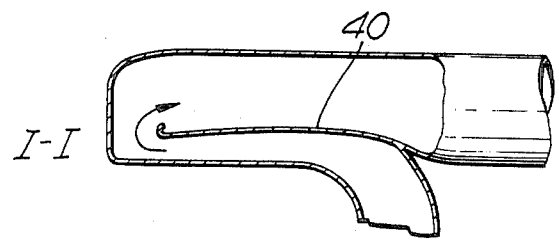
FIGS. 6b to 6d show sectional views of the inlet particle separator.
Figure 6C:
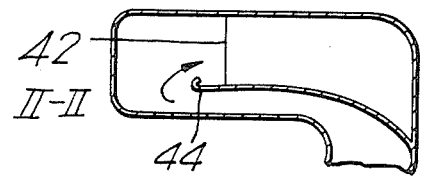
Figure 6D:
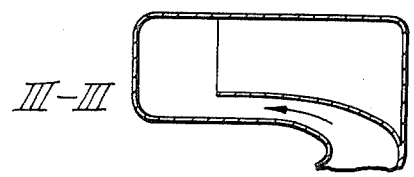

To create a more uniform flow, flow dividers 36 and 38 in FIG. 5 are provided to minimize circumferential variation in mass flow into the scavenge chamber 32. The flow dividers 36, 38 are shaped and arranged to define flow paths which carry the same mass flow. This is achieved by each flow path being of substantially equal length and having an equal flow loss. Where at position 6 it is not possible to increase flow length to equal the other flow paths, the flow divider 38 is shaped to form a restriction 37 which creates a pressure loss in that flow path and thereby reduces mass flow along that path to the same level as the other flow paths. It can be seen from FIG. 5 that the flow from positions 1 and 2 is no longer affected by the flow from positions 3 and 4.

FIGS. 6a–6d show the flow dividers represented in FIG. 5 in the form they actually take in circumferentially extending scavenge chamber 32. Air which is furthest away from the exhaust vent has a relatively straight-forward path to the exhaust vent 35 and is deflected only a small amount in a radially outward direction by the flow divider 40. Contaminated air nearer the exhaust vent 35 is deflected in an axial direction underneath flow divider 40 while flow divider 42 prevents this flow from short-circuiting and mixing with air passing radially outward of the flow divider 42. Contaminated air entering adjacent the exhaust vent 35 is deflected still further in an axial direction, and in this region a flow divider 44 is extended to provide a flow restriction to help equalize the mass flow into the scavenge chamber 32 in this region.

This invention is not just applicable to gas turbine engines and may find use wherever there is a need to separate particles from a gas stream. Furthermore the invention is equally useful when two or more extraction means are provided, each extracting a flow of gas and particles into a respective vent.

We claim:

1. An inlet particle separator comprising:
    a circumferentially extending scavenge chamber defined by one or more wall members and positioned radially outward of a duct, said scavenge chamber having an annular intake portion for receiving a flow of gas and particles from the duct;
    exhaust vent means for venting a flow of gas and particles from the scavenge chamber; and
    at least one flow divider positioned radially between the intake portion and the exhaust vent means, extending axially from one of said one or more wall members, and extending circumferentially at least part way round the scavenge chamber, said at least one flow divider being axially and circumferentially dimensioned and arranged in relation to said one wall member to define a plurality of flow paths of substantially even flow resistance which extend between the intake portion and the exhaust vent means.

2. An inlet particle separator as claimed in claim 1, further comprising at least one further flow divider which extends generally radially and circumferentially and is attached to the at least one flow divider and also to a wall member.

3. An inlet particle separator as claimed in claim 1, wherein the at least one flow divider is dimensioned to progressively decrease in axial length to define a progressively increasing axial gap between it and a wall member as the at least one flow divider extends circumferentially away from the exhaust vent means.

4. An inlet particle separator according to claim 1, wherein the scavenge chamber is of progressively decreasing internal section in a circumferential direction extending away from the exhaust vent means.

5. An inlet particle separator as claimed in claim 1, further comprising extraction means for extracting the flow of gas and particles from the scavenge chamber to the exhaust vent means.

6. An inlet particle separator as claimed in claim 1 wherein the scavenge chamber is axis-symmetric.

7. An inlet particle separator as claimed in claim 1 wherein the intake gas is air.

8. An inlet particle separator as claimed in claim 1 wherein the inlet particle separator is attached to a gas turbine engine and the intake gas is air supplied to a compressor.

* * * * *